United States Patent [19]

Svarz et al.

[11] 4,089,780

[45] May 16, 1978

[54] COLOR REMOVAL PROCESS

[75] Inventors: Jerry J. Svarz; Frank N. Kemmer, both of La Grange, Ill.; Jon O. Fabri, Spartanburg, S.C.

[73] Assignee: Nalco Chemical Company, Oak Brook, Ill.

[21] Appl. No.: 712,334

[22] Filed: Aug. 6, 1976

Related U.S. Application Data

[63] Continuation of Ser. No. 624,414, Oct. 21, 1975, abandoned, which is a continuation of Ser. No. 479,226, Jun. 14, 1974, abandoned.

[51] Int. Cl.$^2$ .............................................. C02B 1/20
[52] U.S. Cl. ...................................... 210/53; 162/16; 210/54
[58] Field of Search ..................... 162/14, 16, 29, 189; 210/53, 54, 51, 52; 260/124 R, 124 H, 124 B

[56] References Cited

U.S. PATENT DOCUMENTS

| 3,372,129 | 3/1968 | Phillips | 210/54 |
|---|---|---|---|
| 3,377,274 | 4/1968 | Burke et al. | 210/53 |
| 3,412,018 | 11/1968 | Monzie | 210/54 R |
| 3,578,587 | 5/1971 | Kemmer | 162/29 |

*Primary Examiner*—Charles N. Hart
*Assistant Examiner*—Ivars Cintins
*Attorney, Agent, or Firm*—Richard L. Johnston

[57] ABSTRACT

Color is removed from paper mill waste waters by treatment with a cationic water soluble polyamine having an average molecular weight of at least 300 at a pH of 2 to 5, preferably 2.5 to 3.5, followed by precipitation with a water soluble anionic or non-ionic organic polymer having an average molecular weight of at least 10,000.

12 Claims, No Drawings

COLOR REMOVAL PROCESS

This is a continuation of Ser. No. 624,414, filed Oct. 21, 1975, which is a continuation of Ser. No. 479,226, filed 6/14/74, both now abandoned.

BACKGROUND

It is generally recognized that the amount of organic material in the form of BOD (biological oxygen demand), COD (chemical oxygen demand), and color bodies currently being discharged into public water supplies from pulp and paper mills is a problem of increasing importance in water pollution.

In the manufacture of paper, cellulose from both hard woods and soft woods is converted to pulp by various processes such as the sulfite process and the sulfate process and the pulp is subjected to various treatments particularly bleaching which involve the use of chemical reagents such as chlorine, chlorine dioxide, sodium hypochlorite and caustic alkalis. As a result of these treatments, the paper making process produces highly colored effluents. The bleaching of the pulp, in particular the caustic extract effluent is a major contributor to pollution problems.

Lignin is a primary source of color in the pulp. Chlorination of the pulp during the bleaching operation results in the formation of color bodies which are leached from the pulp by caustic alkali solutions. Thus, the caustic extract effluent contains a major proportion of the color bodies and other organic materials which have to be disposed of in waste water treatment.

Several processes are now used or advocated for use in removing color from paper mill waste. One of these is the so-called "massive lime process". This process utilizes lime in quantities ranging from 5,000 to 20,000 parts per million (ppm) to remove by coagulation and sedimentation techniques the organic colored bodies from paper mill wastes.

Another process that has been proposed is the use of organic solvent solutions of water insoluble amines as extractants for color bodies from paper mill waste water. Each of these processes has one or more objections which it would be desirable to eliminate.

OBJECTS

It is therefore an object of this invention to provide a new and improved process for removing color from paper mill waste waters wherein color bodies are present due to chemical reaction on or degradation of lignin wherein the waste waters are treated with relatively small amounts of a chemical compound sufficient to combine with the color bodies, thereafter the resultant product is precipitated by the addition of relatively small amounts of another type of chemical compound and the resultant precipitate separated.

A further object of the invention is to provide a process of the type described which is competitive economically with other processes heretofore in use and does not require large capital expenditures. Other objects will appear hereinafter.

BRIEF SUMMARY OF THE INVENTION

In accordance with the invention it has been found that color can be removed from paper mill waste waters containing color bodies due to the degradation of lignin by adding to such waste waters at a pH within the range of about 2 to about 5, preferably within the range of 2.5 to 3.5, a cationic water soluble polyamine having an average molecular weight of at least 300 in sufficient amount to combine with the color bodies present in the paper mill waste water, thereafter adding to the resultant product a water soluble anionic, cationic or non-ionic organic coagulating polymer having an average molecular weight of at least 10,000 in sufficient amount to precipitate said combination color body and polyamine, and separating the resultant precipitate.

DETAILED DESCRIPTION OF THE INVENTION

The invention is particularly applicable to pulp mill bleachery waste waters which are obtained as a result of bleaching processes applied to the pulp wherein chlorine, chlorine dioxide or sodium hypochloride are employed and the pulp is treated with caustic alkali solutions (i.e., sodium hydroxide solutions) which extract the color bodies and produce a highly colored effluent. It is essential for the purpose of the process that the pH of this effluent be reduced to a pH within the range of 2 to 5 and preferably around 2.5 to 3.5. In a typical paper mill plant the waste waters from the whole mill might total 25,000,000 to 30,000,000 gallons per day and the bleachery waste waters would constitute a smaller proportion of the total, say, 1,000,000 to 6,000,000 gallons per day. The present invention can be used to treat all of the waste waters but it is usually more practical and more essential to treat the bleachery waste waters in order to remove or to reduce to a minimum the color bodies therein.

The present invention is based on the discovery that cationic water soluble polyamines having an average molecular weight of at least 300 will combine with the color bodies in the aforementioned waste waters at pH's within the range of 2 to 5 and the resultant product can then be precipitated and removed. Lower molecular weight water soluble amines such as ethylenediamine, diethylenetriamine and tetraethylenepentamine are ineffective.

Especially effective results are obtained with cationic water soluble polyamines having an average molecular weight of at least 300 which are derived from water soluble polyfunctional amines or ammonia and an alkylene dihalide.

The alkylene dihalide reactant can be any alkylene dihalide containing functional or reactive halogen groups including, for example, chlorine and/or bromine but usually the alkylene dichlorides are preferred because of their ready availability and lower costs. A preferred alkylene dihalide is ethylene dichloride. Other examples of useful alkylene dihalides are 1,3-propylene dichloride and 1,2-propylene dichloride. Usually the alkylene group will not contain more than four carbon atoms.

The alkylene dihalide is preferably reacted with a freely water soluble polyfunctional amine or ammonia and, in the case of the amine, most water soluble amines will contain not more than four carbon atoms in a carbon chain unless there are branched chains or cyclic amines in which case they may contain up to six carbon atoms. The amine functional groups preferably comprise at least two hydrogen atoms. Preferred reactants are ammonia, ethylenediamine, diethylene triamine, triethylenetetraamine and tetraethylenepentamine. Of these, ammonia reaction products with ethylene dichloride and ethylene diamine reaction products with ethylene dichloride are preferred cationic water soluble polyamines for the purpose of the invention.

These polyamines are usually prepared by reactions which can be carried out over a wide range of times depending upon the size of the batch as well as temperature and pressure variables. The reactions are also carried out in stages with the addition of amine and alkylene dihalide at intervals into the reaction zone. Generally the reaction takes from about one-half to about twenty hours and often is complete in one to twelve hours time. In these reactions various proportions of the ammonia or amine reactant and the alkylene dihalide can be employed, for example, one to four moles of amine or ammonia might be used up in reaction with one mole of alkylene dihalide over the course of an entire run and more generally, two to three moles of amine per mole of alkylene dihalide are employed.

The reaction itself should be carried out under carefully controlled conditions. The temperature of reaction ranges from 75° to about 200° C. The polymerization is effected under a pressure of 75–1,000 psi. The reaction itself is accomplished by slowly introducing an amine into a reaction zone at a rate sufficient to maintain a fixed predetermined pressure within the above limits. Simultaneously an alkylene dihalide is introduced into the reaction zone at a rate sufficient to maintain a fixed predetermined temperature within the aforementioned limits. Sufficient water should be initially introduced into the reaction zone so that the formed organic product is solubilized therein both at any point during the polymerization and subsequently upon completion of the run.

If such above reaction conditions are followed, polyamine products of relatively high molecular weight are achieved. For example, reaction of ammonia and ethylene dichloride according to the above directions yields mixed polyamines having an average molecular weight in excess of 300 and usually in excess of 500. Polyamine products having a molecular weight even as high as 5,000 may be achieved.

The polymerization reaction is more preferably carried out at temperatures from about 80° C. to 140° C. and under pressures ranging from about 75 psi to about 200 psi. In such cases, the products have better clarity, and less color than do those formed under more stringent reaction conditions.

The above described reaction is exothermic. Therefore, in order to control the reaction and allow a higher addition rate of alkylene dihalide, it is preferred that a cooling jacket or other source of external cooling be applied to the reaction zone. In any case, whether external cooling is applied or not, the flow of alkylene dihalide is adjusted so as to maintain the temperature substantially at any point chosen from within the above mentioned range. Likewise the introduction of amine is controlled by a pressure regulator valve or by any other suitable method whereby the pressure is not allowed to rise or fall to a point substantially different from that particular pressure chosen from within the above stated range.

After the reactor volume has been substantially filled with reaction product, the alkylene dihalide flow is ceased. The residual, unreacted alkylene dihalide is consumed by further reaction with the amine reactant, preferably at the same temperature and pressure as previously employed in the run. Amine introduction is then terminated and excess amine in the reactor vented to the atmosphere or used in a subsequent run. This step of reacting trace amounts of residual unreacted alkylene dihalide is generally accomplished in 5–60 minutes depending upon operating conditions.

If the ammonia has been reacted with an alkylene diahlide, ammonium chloride by-product is produced. Surprisingly enough, by closely following the above directions, this by-product is salted out from the aqueous reaction product solution at room temperature. Thus, a simple separation of ammonium chloride from organic is possible by merely subjecting the reaction product to centrifugation techniques or filtration. It is greatly preferred that the ammonium chloride be centrifuged off from the organic polyamine which remains in aqueous solution.

The relatively high molecular weight polyamine product itself, at the termination of the reaction, is generally in a polyamine hydrohalide form. If the free base is desired, neutralization may be effected by addition of some strong base such as calcium hydroxide, sodium hydroxide, potassium hydroxide, etc. Again the salt formed from the neutralization may be easily separated from the organic free base. By the term "polyamine" it is understood then to mean both the free base, or amine salt form or mixtures of the two.

In carrying out the process, the low pH can be achieved by blending acidic chlorination effluent from the bleaching process with caustic extraction effluent or the caustic extraction effluent can be acidified with sulfuric acid or a waste liquor containing sulfuric acid.

The amount of the cationic water soluble polyamine which is added to the acidic effluent containing color bodies from the degradation of lignin in the paper making process is subject to wide variation. In some cases it can be as low at 30 to 40 ppm and in other cases as high as 300 to 500 ppm. The amounts will vary somewhat depending upon whether a hard wood or a soft wood is being processed in the paper making plant.

The water soluble high molecular weight organic coagulating polymer may be any one of a number of such polymers. Particularly good results have been obtained with anionic water soluble polymers formed by the polymerization of at least one mono-olefinic compound through an unsaturated group. The polymers may be either copolymers or homopolymers and in many cases may have a molecular weight of at least 100,000, and in some cases of at least one million and as high as 30,000,000.

The anionic water soluble polymers preferred for the practice of the invention are composed of at least 10% by weight of at least one monomer which contains an anionic hydrophilic group. Thus, the polymers may contain in a side chain grouping such anionic radicals as carboxylic acid, carboxylic anhydride, carboxylic acid salt, sulfonic acid phosphonous and phosphonic acid and salt groups.

The most readily available polymers that give excellent results in precipitating the color body-containing product are the copolymers and homopolymers of acrylic acid which contain at least 10% by weight of acrylic acid or acrylic acid salts. A particularly useful group of such copolymers are those made from 10% to 90% by weight sodium acrylate and 90% to 10% by weight acrylamide with such polymers having a preferred molecular weight range between one and three million. Among the specific examples of such copolymers are a copolymer of 30% by weight sodium acrylate and 70% by weight acrylamide and a copolymer of 10% by weight sodium acrylate and 90% by weight acrylamide.

A preferred coagulating and precipitating water soluble high molecular weight non-ionic polymer is polyacrylamide.

Other examples of coagulating polymers are given under the heading "ANIONIC COAGULANTS" as set forth in U.S. Pat. No. 3,377,274, the disclosure of which is incorporated herein by reference.

In general, the quantity of coagulating polymer required to precipitate the complex amine-color body material can be very small, for example, one to fifteen ppm.

The invention will be illustrated but is not limited by the following examples in which the quantities are given in parts by weight unless otherwise indicated.

EXAMPLE I

The total bleachery effluent from the bleach plant of a paper mill where hard wood was used to produce the paper pulp was treated according to the procedure previously described with a cationic water soluble polyamine referred to for convenience as polyamine A, at a pH of 3.0 in an amount of 25 ppm to form a color amine complex to which was then added 2 ppm of a water soluble anionic organic coagulating polymer, for convenience referred to as polymer A, so as to precipitate the color amine complex which was then separated by filtration.

Color readings were obtained in terms of APHA units on conventional colorimeters. All treated samples were centrifuged or filtered through No. 40 filter paper to remove floc and the filtrates or centrifugates were adjusted to pH 7.0 before color readings were taken. The raw effluents used in the tests were adjusted to pH 7.0 and then filtered through a millipore filter before color readings were made to get a base line reading on original color.

The polyamine A was obtained by the reaction of ethylene dichloride with ethylenediamine according to the general procedure described in U.S Pat. No. 3,372,129. Molecular weight determinations on this product show an average molecular weight in excess of 300 and the product contains substantially no lower molecular weight polyamine such as ethylenediamine, diethylenetriamine and tetraethylenepentamine.

Polymer B was a copolymer of 30% sodium acrylate monomer and 70% acrylamide obtained in accordance with the process given in Example I of U.S. Pat. No. 3,374,143. A 1% solution of this copolymer has a viscosity of 22,500 cps and the average molecular weight is slightly in excess of 1,000,000.

The bleachery effluent in this case was representative of 900 tons of pulp in a plant where the total effluent was 9,000,000 gallons per day.

The APHA reading of the raw effluent was 850 and the APHA reading after treatment was 650, representing a color reduction of 25–35%.

EXAMPLE II

The procedure was the same as in Example I except that the effluent treated was a bleachery hard wood extract representing 675 tons of pulp with a total volume of effluent of 0.7 million gallons per day.

In this case, the dosage of amine A was 100 ppm and the dosage of polymer B was 5 ppm. The APHA color reading of the raw effluent was 6,000 and the APHA color reading after treatment was 1500. Thus, the color reduction was 75%.

EXAMPLE III

The procedure was the same as in Example I except that the effluent was a bleachery pine extract representing 225 tons of pulp with a total volume of effluent of 0.23 million gallons per day.

The dosage of amine A was 300 ppm and the dosage of polymer B was 5 ppm.

The APHA color reading of the raw effluent was 20,000 and the APHA reading after treatment was 5,000, representing a color reduction of 75%.

EXAMPLE IV

The procedure was the same as in Example I except that a bleachery effluent was used which consisted of 40% pine extract and 60% hard wood extract, representing 900 tons of pulp and a total volume of effluent of 0.93 million gallons per day.

The dosage of amine A was 300 ppm and the dosage of polymer B was 5 ppm.

The APHA reading of the raw effluent was 14,000 and the APHA reading after treatment was 3,000. Hence, there was a color reduction of 80%.

EXAMPLE V

The procedure was the same as in Example II except that the dosage of amine A was 400 ppm. The color removal was 88%. The same amount of color removal was obtained using a dosage of 500 ppm of amine A.

EXAMPLE VI

The procedure was the same as in Example III except that the dosage of amine A was 400 ppm. The color removal was 83%. When the test was repeated with a dosage of 500 ppm of amine A the color removal was 90% and with a dosage of 700 ppm of amine A the color removal was 93%.

EXAMPLE VII

The procedure of Example IV was repeated using a dosage of 400 ppm of amine A. The color removal was 90%. Using the same procedure but with a dosage of 500 ppm of amine A the color removal was 92%.

The procedure was the same as in Example I except that the sample treated was from the total plant effluent of a paper pulp in which the processing involved the use of 25 million gallons of water per day and the pH was 5, the amount of amine A added was 125 ppm and the amount of polymer B added was one ppm.

EXAMPLE IX

The same general procedure was used as in Example VIII except that a total plant effluent of a paper pulp processing plant was treated at a pH of 5 with 50–100 ppm of a polyamine prepared by the reaction of ammonia with ethylene dichloride as described in the Example of U.S. Pat. No. 3,607,738, the disclosure of which is incorporated herein by reference. This treatment was followed by the addition a coagulating anionic polymer (e.g. Polymer B) and sedimentation to remove the precipitated color-amine reaction product.

In carrying out the process it is also possible to acid extract the precipitated sludge and recover a portion of the cationic water soluble polyamine which can then be recycled in the process. This may not always be economical.

In carrying out the tests described in the examples it was noted that the color body-amine complex tended to stay colloidal or dispersed and would not separate or settle without the addition of the polymer in the second stage. While, non-ionic and anionic polymers were all effective in coagulating and causing the settling or precipitation of the color amine complex, the anionic polymers appeared to be the most effective.

It should be understood that the proportions of the various additives may vary to some extent depending upon the composition of the particular paper mill waste water. The process is particularly useful for removing color from paper pulp bleachery effluents where the content of color bodies is relatively high. It may not always be practical from an economical standpoint to use the process on the total effluent. The treatment can also be used not only for the purpose of reducing color in paper pulp waste waters but also for reducing total solids and for reducing total suspended solids.

The invention is hereby claimed as follows:

1. In a process for removing color from cellulose paper pulp soft wood and hard wood bleachery effluents wherein color bodies are present due to chemical reaction on or degradation of lignin, the improvement which consists essentially in adding to said effluents at a pH of 2 to 5 a cationic water soluble polyamine having an average molecular weight of at least 300 in sufficient amount to combine with said color bodies to form a color amine complex, said pH not exceeding 5 for hard wood bleachery effluents and not exceeding 3.5 for soft wood bleachery effluents, thereafter adding to the resultant product a water soluble anionic or non-ionic organic coagulating polymer having an average molecular weight of at least 10,000 in sufficient amount to precipitate said color amine complex directly from said effluents, and separating the resultant precipitate.

2. A process as claimed in claim 1 in which the pH of the effluents is within the range of 2.5 to 3.5.

3. A process as claimed in claim 1 in which said cationic water soluble polyamine is formed by reacting an alkylene dihalide having not more than 4 carbon atoms in the alkylene groups with ammonia or a water soluble polyamine.

4. A process as claimed in claim 3 in which the water soluble polyamine is selected from the group consisting of alkylene polyamines containing not more than 4 carbon atoms in the alkylene groups and from 2 to 5 amino groups.

5. A process as claimed in claim 1 in which the cationic water soluble polyamine is a polymer of ammonia and ethylene dichloride.

6. A process as claimed in claim 1 in which the cationic water soluble polyamine is a polymer of ethylenediamine and ethylene dichloride.

7. A process as claimed in claim 1 in which said organic coagulating polymer is in anionic copolymer of sodium acrylate and acrylamide containing 10 to 90% by weight sodium acrylate and 90 to 10% by weight acrylamide.

8. A process as claimed in claim 1 in which said coagulating polymer is a polyacrylamide.

9. A process for removing color from cellulose paper pulp soft wood and hard wood bleachery effluents wherein color bodies are present due to chemical reaction on or degradation of lignin which consists essentially in adjusting the pH of said effluents to a pH within the range of 2.5 to 3.5, adding to the resultant effluents a cationic water soluble polyamine formed by reacting an alkylene dihalide having not more than 4 carbon atoms in the alkylene groups with ammonia or a water soluble alkylene polyamine containing not more than 4 carbon atoms in the alkylene groups and from 2 to 5 amino groups, said polyamine having an average molecular weight of at least 300 and the amount added to the effluents being sufficient to combine with said color bodies to form a color amine complex, thereafter adding to the resultant effluents an anionic organic coagulating polymer which is a copolymer of sodium acrylate and acrylamide containing 10-90% by weight sodium acrylate and 90-10% by weight acrylamide in sufficient amount to precipitate said color amine complex directly from said effluents, the dosage of said cationic water soluble polyamine being within the range of about 30-500 ppm and the dosage of said anionic coagulating polymer being within the range of 1-15 ppm, and separating the resulting precipitate.

10. In a process for removing color from cellulose paper pulp soft wood and hard wood bleachery effluents wherein color bodies are present due to chemical reaction on or degradation of lignin, the improvement which consists essentially in adding to said effluents at a pH of 2 to 5 a cationic water soluble polyamine having an average molecular weight of at least 300 in sufficient amount to combine with said color bodies to form a color amine complex, said cationic water soluble polyamine being a polymer of ethylene diamine and ethylene dichloride, said pH not exceeding 5 for hard wood bleachery effluents and not exceeding 3.5 for soft wood bleachery effluents, thereafter adding to the resultant product a water soluble anionic organic coagulating polymer having an average molecular weight of at least 10,000 in sufficient amount to precipitate said color amine complex, said anionic organic coagulating polymer being a copolymer of approximately 70% by weight acrylamide and 30% by weight sodium acrylate, and separating the resultant precipitate.

11. In a process for removing color from cellulose paper pulp soft wood and hard wood bleachery effluents wherein color bodies are present due to chemical reaction on or degradation of lignin, the improvement which consists essentially in adding to said effluents at a pH of 2 to 5 a cationic water soluble polyamine having an average molecular weight of at least 300 in sufficient amount to combine with said color bodies to form a color amine complex, said cationic water soluble polyamine being a polymer of ethylene diamine and ethylene dichloride, said pH not exceeding 5 for hard wood bleachery effluents and not exceeding 3.5 for soft wood bleachery effluents, thereafter adding to the resultant product a water soluble non-ionic organic coagulating polymer having an average molecular weight of at least 10,000 in sufficient amount to precipitate said color amine complex, said non-ionic organic coagulated polymer being a polyacrylamide, and separating the resultant precipitate.

12. In a process for removing color from cellulose paper pulp soft wood and hard wood bleachery effluents wherein color bodies are present due to chemical reaction on or degradation of lignin, the improvement which consists essentially in adding to said effluents at a pH of 2 to 5 a cationic water soluble polyamine having an average molecular weight of at least 300 in sufficient amount to combine with said color bodies to form a color amine complex, said cationic water soluble polyamine being the product of reaction of ammonia with ethylene dichloride, said pH not exceeding 5 for hard wood bleachery effluents and not exceeding 3.5 for soft wood bleachery effluents, thereafter adding to the resultant product a water soluble anionic organic coagulating polymer having an average molecular weight of at least 10,000 in sufficient amount to precipitate said color amine complex, said anionic organic coagulating polymer being a copolymer of approximately 70% by weight acrylamide and 30% by weight sodium acrylate, and separating the resultant precipitate.

* * * * *